April 19, 1960 N. M. NORMAN 2,932,957
REFRIGERATING UNIT FOR CARGO TRANSPORTING VEHICLE BODIES
Filed Aug. 18, 1958 3 Sheets-Sheet 1
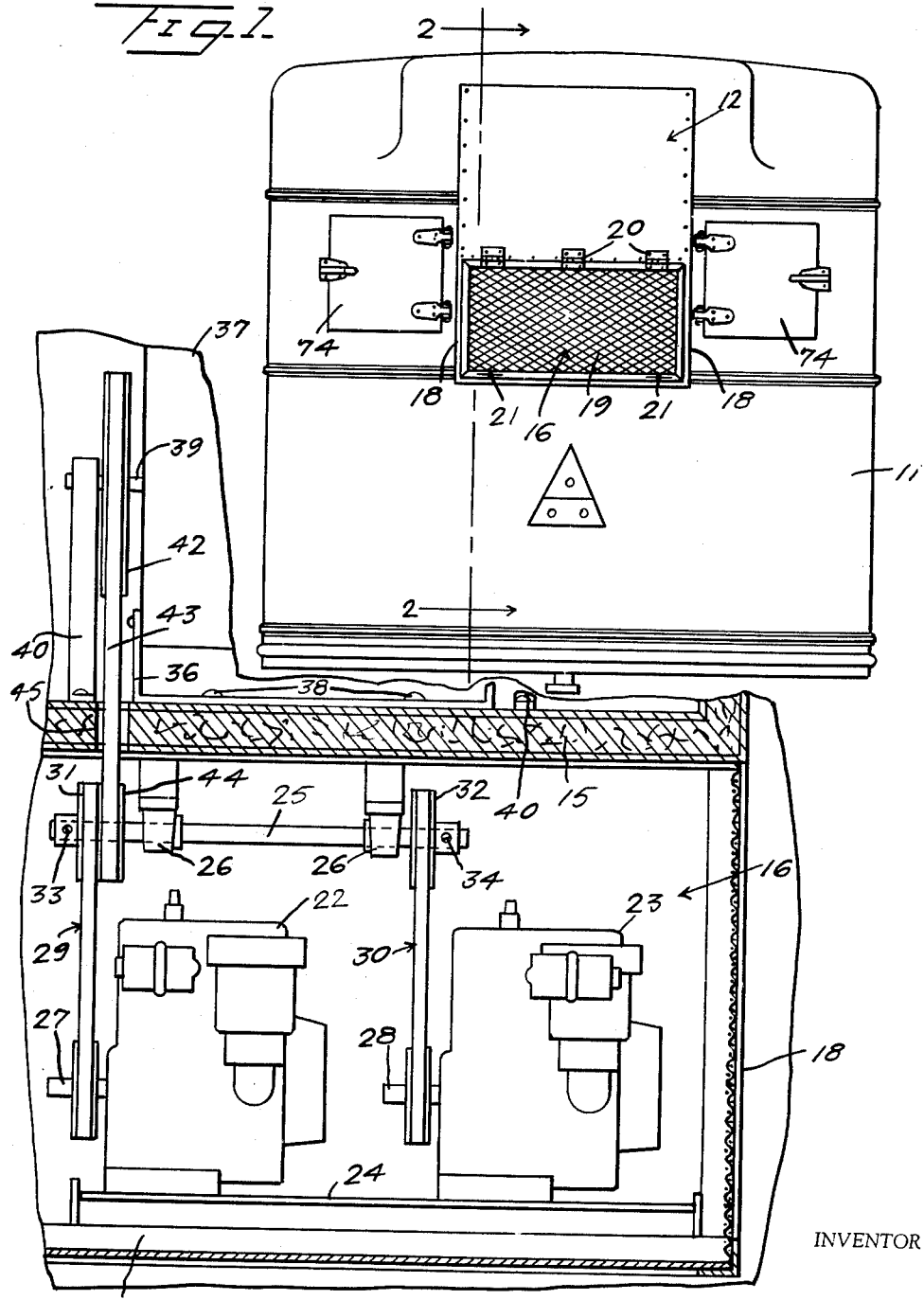

April 19, 1960
N. M. NORMAN
2,932,957
REFRIGERATING UNIT FOR CARGO TRANSPORTING VEHICLE BODIES
Filed Aug. 18, 1958
3 Sheets-Sheet 2
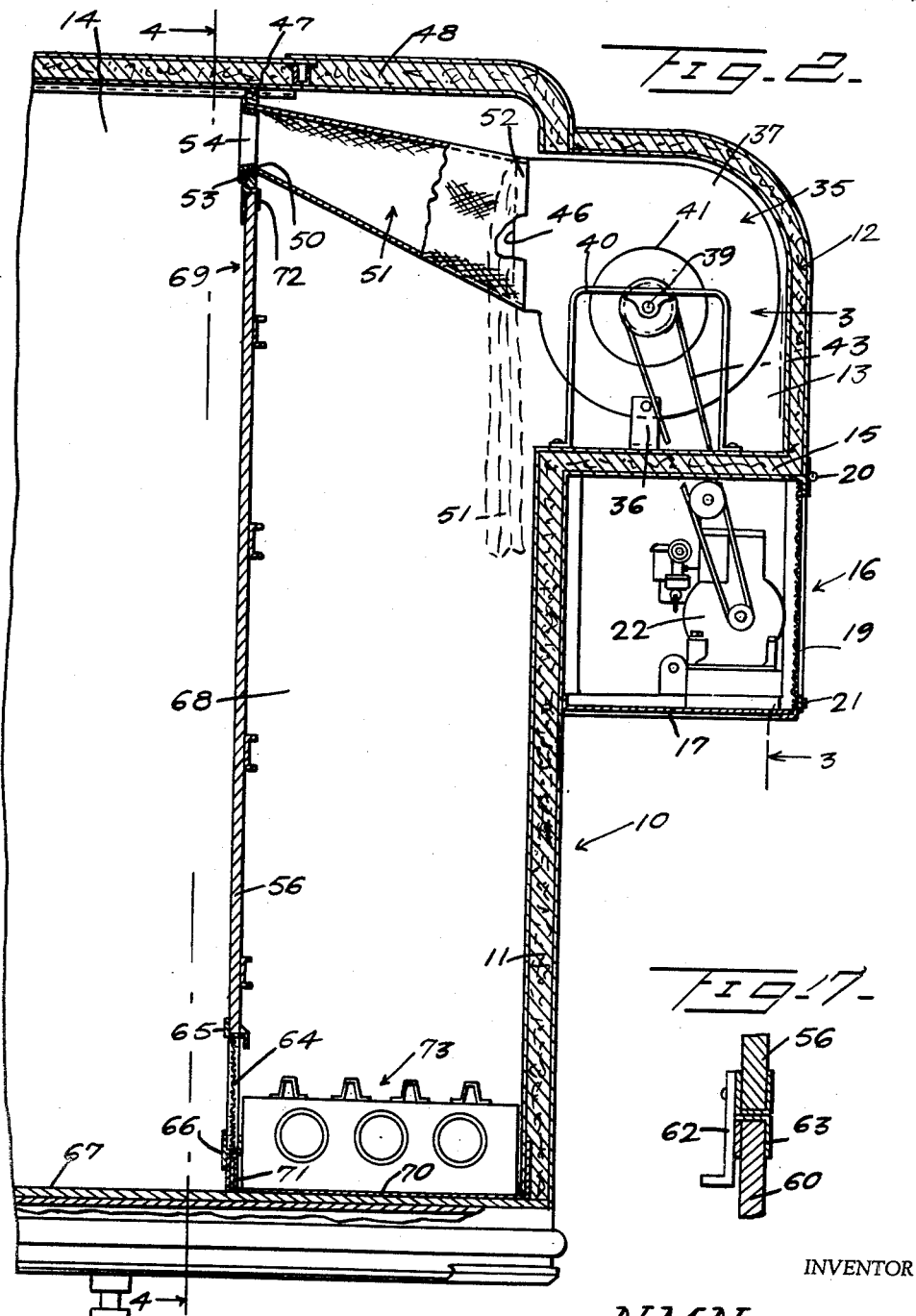
INVENTOR
N.M. Norman
BY John N. Randolph
ATTORNEY April 19, 1960 N. M. NORMAN 2,932,957
REFRIGERATING UNIT FOR CARGO TRANSPORTING VEHICLE BODIES
Filed Aug. 18, 1958 3 Sheets-Sheet 3
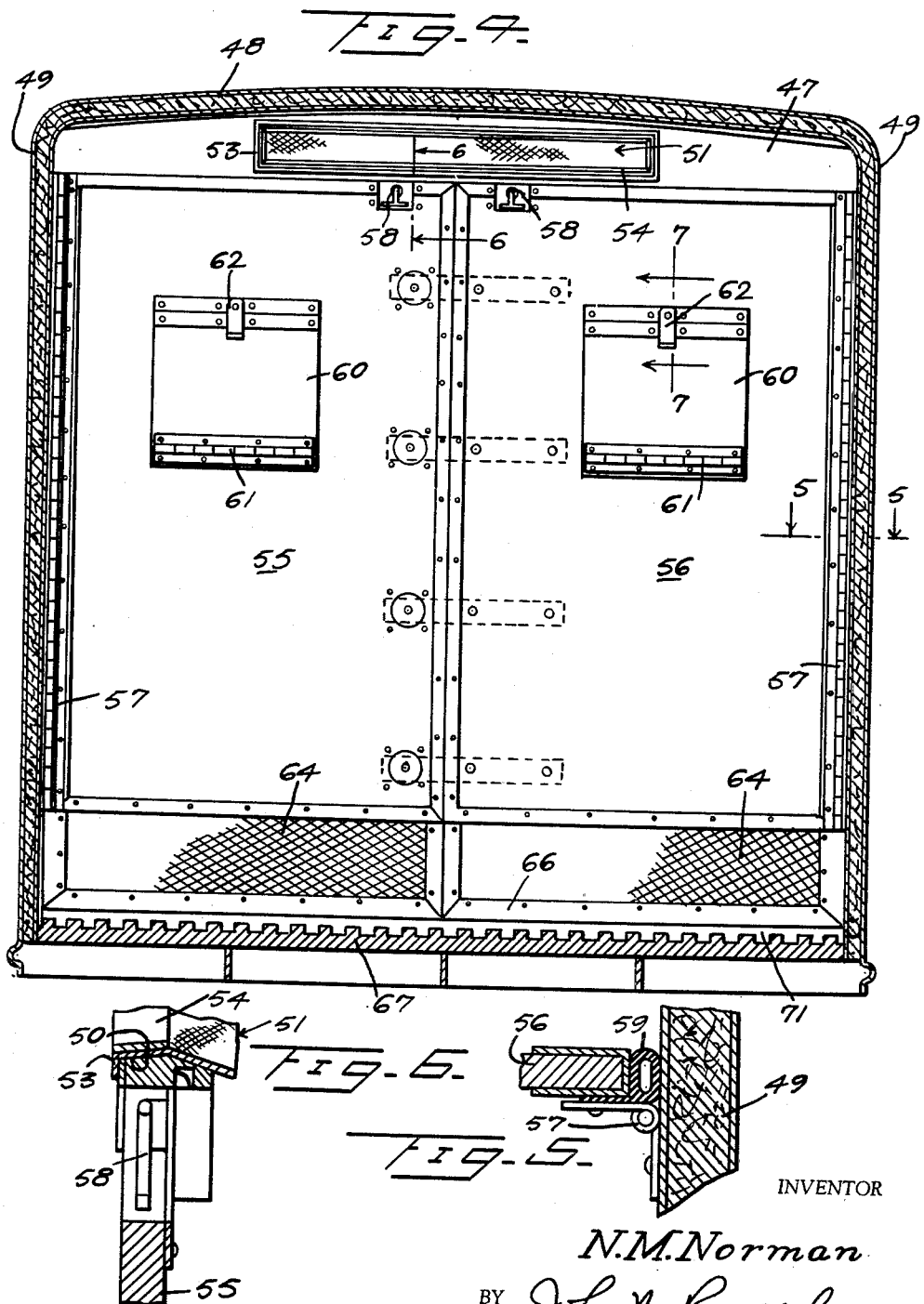
INVENTOR
N.M. Norman
BY John N. Randolph
ATTORNEY United States Patent Office 2,932,957
Patented Apr. 19, 1960

2,932,957
REFRIGERATING UNIT FOR CARGO TRANSPORTING VEHICLE BODIES

Noah M. Norman, Elba, Ala., assignor, by mesne assignments, to Dorsey Trailers, Inc., Dover, Del., a corporation of Delaware Application August 18, 1958, Serial No. 755,734

4 Claims. (Cl. 62—329)

This invention relates to a novel refrigeration installation adapted for mounting in an end of a cargo transporting vehicle body, such as a truck or trailer, by means of which a minimum of space will be occupied by the refrigerating unit and whereby operating efficiency of the unit will be enhanced.

More particularly, it is an aim of the present invention to provide a vehicle body having a bulged extension at one end thereof defining a cavity opening inwardly of the vehicle body for accommodating a blower to thereby conserve otherwise usable space within the vehicle body and to enable the blower to be more advantageously positioned for maximum efficiency in effecting air circulation.

A further object of the invention is to provide a refrigeration unit wherein the power source for the blower may be mounted externally of the vehicle body, readily convenient for servicing and in a most convenient position for connection to the blower.

A further object of the invention is to provide a refrigerating unit including movably mounted members forming a bulkhead of a coolant compartment of the vehicle body and which members can be moved to positions to enable the coolant compartment to be utilized as cargo space, where refrigeration of the cargo is not required.

Various other objects and advantages of the invention will hereinafter become more fully apparent from the following description of the drawings, illustrating a presently preferred embodiment thereof, and wherein:

Figure 1 is a front elevational view of a cargo transporting vehicle body, constructed in accordance with the invention;

Figure 2 is an enlarged fragmentary longitudinal vertical sectional view, taken substantially along a plane as indicated by the line 2—2 of Figure 1;

Figure 3 is an enlarged fragmentary transverse vertical sectional view, taken substantially along the line 3—3 of Figure 2;

Figure 4 is a cross sectional view of the vehicle body, on a reduced scale, taken substantially along a plane as indicated by the line 4—4 of Figure 2;

Figure 5 is an enlarged fragmentary horizontal sectional view, taken substantially along a plane as indicated by the line 5—5 of Figure 4, and Figures 6 and 7 are enlarged fragmentary vertical sectional views, taken substantially along planes as indicated by the lines 6—6 and 7—7, respectively, of Figure 4.

Referring more specifically to the drawings, the numeral 10 designates generally the forward portion of a transport vehicle body which has been illustrated as a trailer body; however, the novel construction thereof is equally well adapted to other forms of vehicle bodies. The front wall 11 of the vehicle body has a forwardly offset portion 12 located adjacent the upper end of said front wall and defining a chamber or cavity 13 which opens rearwardly into the interior 14 of the vehicle body. The forwardly bulged portion 12 includes a substantially horizontal bottom wall 15.

An enclosure, designated generally 16, is supported by and extends forwardly from the front wall 11 and is disposed directly beneath the bulged portion 12. The enclosure 16 includes a rigid horizontally disposed bottom 17, side walls 18, of foraminous or openwork construction, as best seen in Figure 3, and a foraminous front wall 19 which is swingably mounted at its upper edge by hinges 20 and which is normally held in a closed position by latches 21.

Two small gasoline engines or other power sources 22 and 23 are disposed within the enclosure 16 and are supported on a base 24 which is fixed to the bottom 17. A countershaft 25 is disposed above the engines 22 and 23 within the enclosure 16 and is journaled in bearings 26 which are fixed to and depend from the underside of the horizontal portion 15. The drive shafts 27 and 28 of the engines 22 and 23, respectively, are connected to the countershaft 25 by belt and pulley drives 29 and 30, respectively. The belt and pulley drives 29 and 30 include pulleys 31 and 32, respectively, which are detachably fixed to the shaft 25 as by means of setscrews 33 and 34, respectively. Only one of the engines is utilized for driving the countershaft 25 and the other engine is merely available for use in an emergency, and the pulley 31 or 32, associated with the engine not being used, is released by loosening its setscrew 33 or 34 so that the shaft 25 can turn relative thereto, or said pulley can be completely removed from the shaft 25.

A blower 35, preferably of the centrifugal type, is disposed in the cavity or chamber 13 and is supported by a bracket 36 which is secured to the casing 37 of the blower and supported on and fixed to the bottom 15, as by fastenings 38 (Figure 3). The shaft 39 of the blower 35 has its end portions journaled in bearing supports 40 which are fixed to and rise from the bottom 15 and which are disposed in the chamber 13. At least one side of the blower casing 37 is provided with an air inlet opening 41.

A belt pulley 42 is fixed to the blower shaft 39, between one side of the casing 37 thereof and one of the bearing supports 40 and is connected by an endless belt 43 to a belt pulley 44 which is fixed to the countershaft 25. The bottom 15 has an elongated opening 45 through which the flights of the belt 43 loosely extend. The outlet 46 of the blower casing 37 opens into the interior 14 of the body 10 and directly toward the rear end of said body.

A partition member 47 extends completely across a part of the upper portion of the interior 14 and is secured to the underside of the roof 48 and to the upper portions of the inner sides of the side walls 49 of the body 10. Said partition member 47 has an elongated opening 50 extending throughout a substantial portion of the length thereof.

A flexible duct member 51, preferably formed of fabric, has a restricted end 52 which is disposed over and suitably secured around the blower casing outlet 46. The duct 51 is flared from its end 52 to its opposite end 53. The duct end 53 extends rearwardly through the partition opening 50 and is of a size to correspond with the size of said opening. Any suitable means may be provided for detachably securing the duct end 53 in the opening 50, for example, as illustrated in Figure 6, the surfaces defining the opening 50 may be flared toward the rear side of the partition 47 and a bevel frame 54 can be inserted into the opening 50 through the enlarged rear end thereof. The frame 54 is beveled or flared to correspond to the flare of the opening 50 and is made slightly smaller than said opening so that the enlarged end 53 of the duct can be clamped in the opening 50, between the walls of said opening and said frame 54, and so that the frame 54 can be readily removed for detaching the duct end 53 from the partition 47. Any other suitable means may be utilized for detachably securing the duct end 53 in the opening 50.

Two doors 55 and 56 are swingably connected by hinges 57 to the inner sides of the side walls 49, said hinges being disposed directly beneath the ends of the partition 47. Conventional latches 58 are provided in the upper portions of the doors 55 and 56 for latching said doors in closed coplanar positions relative to one another, as seen in Figures 2 and 4, beneath and coplanar with the partition 47. The latches 58 are operable from rear sides of the doors 55 and 56, as seen in Figures 4 and 6. A tubular seal 59 may be provided between the hinged edge of each door, and the side wall 49 to which said door is connected, and which seals are compressed, when the doors are closed, for sealing the space between the door edges and walls 49, as illustrated in Figure 5.

Each door 55 and 56, near its top, has a small closure 60 which is hingedly mounted at its bottom edge as seen at 61 to swing downwardly and rearwardly of said door to an open position. The closures 60 are normally maintained in closed positions by swinging latches 62, as seen in Figures 4 and 7 and are prevented from swinging forwardly past a fully closed position by a flange or lip 63, fixed to a part of the door surrounding said closure 60.

The doors 55 and 56, with the closures 60 in closed positions, are solid except for a foraminous bottom portion or panel 64 constituting the lower part of each door and including a metal frame 65 having a bottom lip 66 which is disposed slightly above and spaced from the floor 67 of the body 10. The portion of the vehicle body interior 14, located between the front wall 11 and the doors 55 and 56, when in a closed position, forms a refrigerant compartment 68 adapted to contain a refrigerant such as ordinary ice or Dry Ice, not shown. Thus, the doors 55 and 56, when in closed positions, combine with the partition 47 to form a bulkhead 69 which separates the refrigerant compartment 68 from the remainder of the interior 14 of the vehicle body. As seen in Figure 2, the blower cavity or chamber 13 opens into the upper part of the refrigerant compartment 68.

A portion of the floor 67, which is located within the refrigerant compartment, preferably has a sheet metal lining 70 which is provided with an upstanding folded edge 71. Said folded edge 71 extends entirely across the interior 14 of the vehicle body and is engaged by the depending lips 66 to prevent swinging movement of the doors 55 and 56 forwardly past fully closed positions, as illustrated in Figure 2. The partition 47 is also provided with depending stops 72, as seen in Figure 2, for engaging behind upper edge portions of the doors 55 and 56 to prevent the upper portions of the doors from swinging forwardly beyond positions directly beneath the partition 47. A collapsible ice rack 73, of a conventional construction, is mounted on the floor 70 of the compartment 68, as illustrated in Figure 2.

With the doors 55 and 56 in closed positions, the bulkhead 69 separates the refrigerating compartment 68 from the interior 14 of the remainder of the vehicle body 10 which is intended for the storage of perishable cargo requiring refrigeration. The blower 35 is operated by the engine 22 or 23 which is coupled to the shaft 25, as heretofore described, so that air is drawn inwardly of the refrigeration compartment 68 from the cargo storage space 14 through the foraminous panels 64 and is cooled during its upward travel through the refrigerating compartment 68. The cool air is drawn into the chamber 13 and into the blower casing through the inlet 41 and is expelled therefrom through the blower outlet 46 and the duct 51 into the upper part of the cargo space 14, as clearly illustrated in Figure 2.

Thus, due to the arrangement of the blower 35 in the chamber 13, formed by the outwardly bulged body portion 12, the cold air is propelled longitudinally of the vehicle body 10 in a straight line rather than being required to travel through a right angular corner of a duct as is conventionally necessary where the blower is mounted within the interior of the vehicle body and at a right angle to its position of Figure 2, so that the shaft of the blower can be coupled to the drive shaft of the power source which is mounted externally of the front wall of the vehicle body. In addition, the mounting of the blower 35 within the chamber 13 affords additional space within the interior of the vehicle body 10. The foraminous walls 18 and 19 of the enclosure 16 admit ample air to cool the operating engine 22 or 23 while, at the same time, substantially concealing said engines from view, to materially enhance the appearance of the body 10.

When the vehicle body 10 is being used for transporting cargo not requiring refrigeration, the bulkhead doors 55 and 56 can be swung away from the front wall 11 to open positions against the side walls 49 and the flexible air duct 51 can be disconnected from the partition 47 to hang loosely as seen in broken lines in Figure 2. The ice rack 73 can also be collapsed or removed so that the compartment 68 can then be utilized as additional cargo space.

The closures 60 can be opened to afford access to the refrigeration compartment 68, through the bulkhead 69 for replenishing the supply of ice, not shown, therein. Access may also be had to the refrigeration compartment 68 through small access doors 74 in the front wall 11, as seen in Figure 1.

Various modifications and changes are contemplated and may be resorted to, without departing from the function or scope of the invention as hereinafter defined by the appended claims.

I claim as my invention:

1. A cargo transporting vehicle body having an elongated interior defining a storage space, said body including an end wall, a bulkhead within the body and spaced from said end wall, a housing supported by and disposed entirely externally of said body, said housing including a first compartment opening into the interior of the body through said end wall, a blower mounted in said first compartment having an outlet opening into the interior of the body and an inlet communicating with the interior of the body through said end wall, a power source connected to and driving said blower, said housing having a second compartment enclosing and supporting the power source, and said second compartment having a foraminous portion opening to the atmosphere and separated from the interior of the body by the first compartment and said end wall.

2. A transport vehicle body as in claim 1, said bulkhead combining with said end wall to form a refrigeration compartment with which said blower inlet communicates, said bulkhead having a foraminous bottom portion forming an air inlet to the refrigeration compartment, and an air duct connected to and extending from the blower outlet longitudinally of the vehicle body and having an outlet end opening through the upper part of said bulkhead.

3. A transport vehicle body as in claim 2, said upper part of the bulkhead constituting a stationary partition, and hingedly mounted doors forming the remainder of said bulkhead and including foraminous bottom panels constituting the foraminous bottom portion of the bulkhead, said bulkhead doors being swingable to open positions against side walls of the vehicle body for utilization of the refrigeration compartment as additional cargo space.

4. A transport vehicle body as in claim 3, said air duct being formed of a flexible material, said bulkhead partition having an opening through which the outlet end of said air duct extends, and means for detachably mounting said duct outlet in the partition opening for detachment of the duct from said partition, when the bulkhead doors are in open positions, whereby the space normally occupied by the extended air duct may be utilized as cargo space.

References Cited in the file of this patent

UNITED STATES PATENTS

| | | |
|---|---|---|
| 1,242,091 | Watkins | Oct. 2, 1917 |
| 2,109,310 | Cordrey | Feb. 22, 1938 |
| 2,229,220 | Parks | Jan. 21, 1941 |
| 2,291,546 | George | July 28, 1942 |
| 2,544,242 | Van Dorn et al. | Mar. 6, 1951 |
| 2,735,277 | Clark | Feb. 21, 1956 |